Nov. 29, 1966    C. W. BROWN ETAL    3,289,174
MEMORY SECTOR SELECTION CIRCUIT
Filed Jan. 22, 1963    2 Sheets-Sheet 2

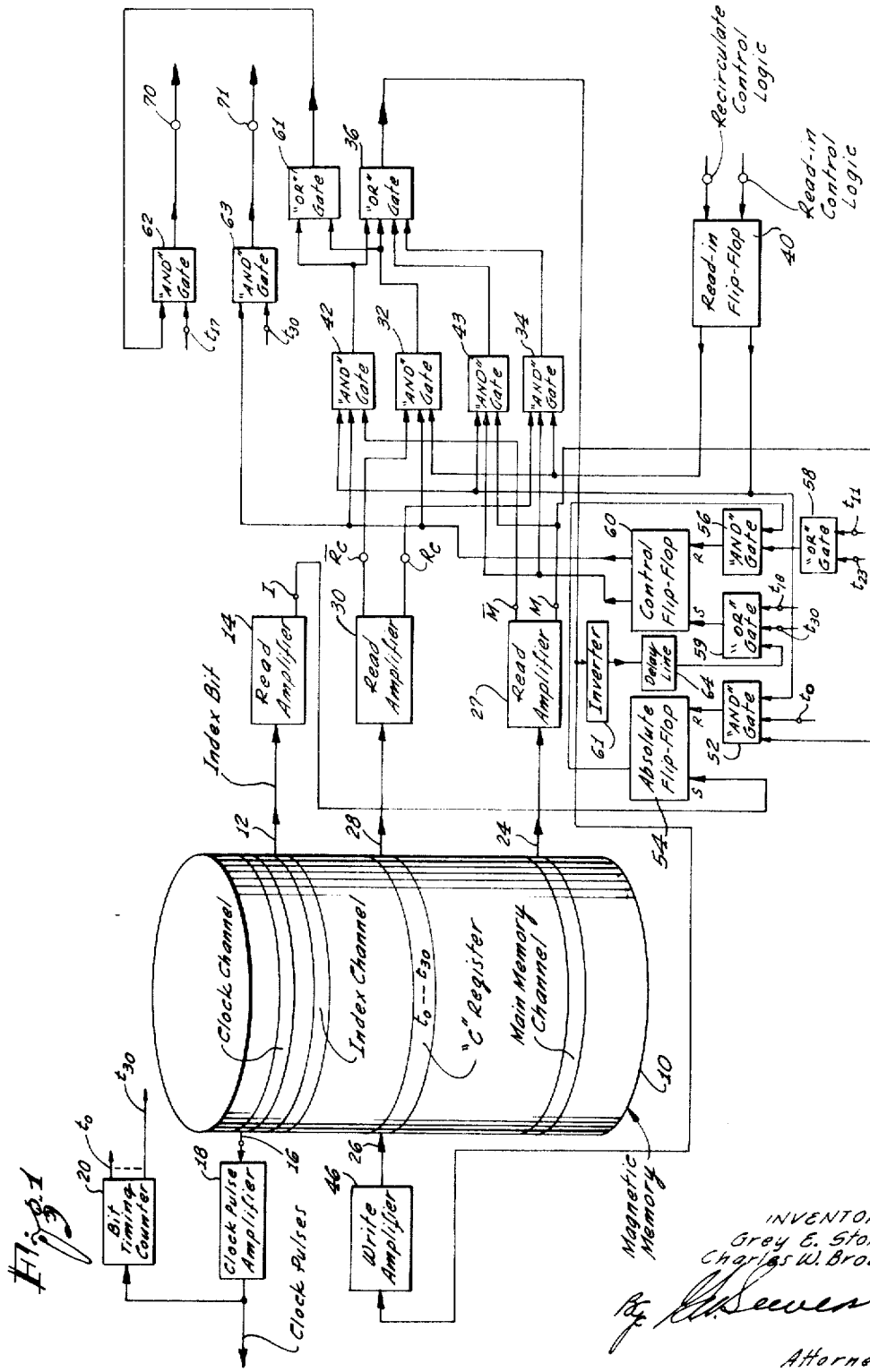

Fig. 2A

MEMORY INSTRUCTION

Spacer Bit ↓ | Next Instruction Address | Operand Address | Order | Absolute Bit ↓

| $t_{30}$ | $t_{29}$ | $t_{28}$ | $t_{27}$ | $t_{26}$ | $t_{25}$ | $t_{24}$ | $t_{23}$ | $t_{22}$ | $t_{21}$ | $t_{20}$ | $t_{19}$ | $t_{18}$ | $t_{17}$ | $t_{16}$ | $t_{15}$ | $t_{14}$ | $t_{13}$ | $t_{12}$ | $t_{11}$ | $t_{10}$ | $t_{9}$ | $t_{8}$ | $t_{7}$ | $t_{6}$ | $t_{5}$ | $t_{4}$ | $t_{3}$ | $t_{2}$ | $t_{1}$ | $t_{0}$ |

Sector — Track — Sector — Track

Fig. 2B

NON-MEMORY INSTRUCTION

Spacer Bit ↓ | Next Instruction Address | Instruction Duration Count | Register Address | Order | Absolute Bit ↓

| $t_{30}$ | $t_{29}$ | $t_{28}$ | $t_{27}$ | $t_{26}$ | $t_{25}$ | $t_{24}$ | $t_{23}$ | $t_{22}$ | $t_{21}$ | $t_{20}$ | $t_{19}$ | $t_{18}$ | $t_{17}$ | $t_{16}$ | $t_{15}$ | $t_{14}$ | $t_{13}$ | $t_{12}$ | $t_{11}$ | $t_{10}$ | $t_{9}$ | $t_{8}$ | $t_{7}$ | $t_{6}$ | $t_{5}$ | $t_{4}$ | $t_{3}$ | $t_{2}$ | $t_{1}$ | $t_{0}$ |

Sector — Track — Sector — Track

Fig. 2C

OPERAND WORD

Spacer Bit ↓   Sign Bit ↓

| $t_{30}$ | $t_{29}$ | $t_{28}$ | $t_{27}$ | $t_{26}$ | $t_{25}$ | $t_{24}$ | $t_{23}$ | $t_{22}$ | $t_{21}$ | $t_{20}$ | $t_{19}$ | $t_{18}$ | $t_{17}$ | $t_{16}$ | $t_{15}$ | $t_{14}$ | $t_{13}$ | $t_{12}$ | $t_{11}$ | $t_{10}$ | $t_{9}$ | $t_{8}$ | $t_{7}$ | $t_{6}$ | $t_{5}$ | $t_{4}$ | $t_{3}$ | $t_{2}$ | $t_{1}$ | $t_{0}$ |

Fig. 3

| | ($t_{29}$) | ($t_{28}$) | ($t_{27}$) | ($t_{26}$) | ($t_{25}$) | ($t_{24}$) | ($t_{23}$) |
|---|---|---|---|---|---|---|---|
| | $t_{17}$ | $t_{16}$ | $t_{15}$ | $t_{14}$ | $t_{13}$ | $t_{12}$ | $t_{11}$ |
| | 1 | 1 | 1 | 1 | 1 | 1 | 1 |
| Read In | 1 | 1 | 1 | 1 | 1 | 1 | 0 |
| 1st Circulation | 1 | 1 | 1 | 1 | 1 | 0 | 1 |
| 2nd Circulation | 1 | 1 | 1 | 1 | 1 | 0 | 0 |
| nth Circulation | 0 | 0 | 0 | 0 | 0 | 0 | 0 |

INVENTORS
Grey E. Stone
Charles W. Brown

Attorney

United States Patent Office 3,289,174
Patented Nov. 29, 1966

3,289,174
MEMORY SECTOR SELECTION CIRCUIT
Charles W. Brown, Burbank, and Grey E. Stone, Covina, Calif., assignors to General Precision, Inc., a corporation of Delaware
Filed Jan. 22, 1963, Ser. No. 253,205
2 Claims. (Cl. 340—172.5)

The present invention relates generally to electronic digital computers, and the like, and it relates more particularly to an improved and eminently simple control system for use in such a computer and which provides for a minimum access time for data and instruction words from the memory of the computer.

It is usual for many present-day electronic digital computers to include a rotatable magnetic drum or disc which functions as the memory for the computer. As is well known, the memory serves to store information for use in the computer in the form of a multiplicity of multi-digit binary-coded data and instruction words. The different multi-digit binary-coded data and instruction words utilized by the computer are stored in the memory in a multiplicity of tracks and in a plurality of sectors in each track.

In order to select a data or instruction word from the memory of the computer, the usual prior art practice has been to introduce the sector address of a desired word into a register; and then to compare the sector address in the register with successive sector addresses read from a particular track on the memory, or from an external counter synchronized with the rotating memory. When coincidence occurs between the sector address in the register and a sector address read from the track or counter, an appropriate control causes the data or instruction word in the corresponding sector to be read into the computer system.

The prior art computer selection system described in the preceding paragraph, is relatively complicated in that it entails extraneous compare circuitry and in that it requires an external counter, or an extraneous track on the memory for the sector addresses. The improved control system of the invention provides for a minimum of access time in the computer without the complexity of the prior art systems.

The computer to be described utilizes an improved selection system which does not depend upon the comparison of a desired sector address with a succession of sector addresses read from memory or associated counter. Instead, the selection system of the invention causes a number designating the desired sector address of a particular data or instruction word to be introduced to a register. The register has associated circuitry which functions in a manner to be described to count the number in the register down or up to a reference value in successive sector-word times. When the count reaches the reference value, the word from the corresponding sector of a selected track in the memory is either selected from the memory, or a particular word is introduced to the designated sector of a selected track in the memory.

The system of the invention permits, therefore, a relative addressing technique to be used in eminently simple control circuitry, rather than an absolute addressing technique. By means of the relative addressing technique of the system of the invention, each instruction word includes a portion representative of a binary number which, in turn, designates the sector address of the corresponding data word or of the next instruction. This address, however, instead of being necessarily referenced with respect to an absolute index position of the memory, as is usually the case in the prior art computers, is referenced to the particular sector address of the instruction actually being executed.

The relative addressing technique described above, as accomplished by the simplified system of the invention, results in a material saving in access time. This is because there is no need for the memory to return to an index position prior to the selection of a data word or of the next instruction word.

As the computer program proceeds, the relative addressing system of the present invention permits the data and instruction words to be selected from memory on a basis referenced, in each instance, to the sector of the instruction being executed rather than to an absolute memory position. This permits the program to proceed with a minimum of dead time, and with a material reduction in access time of the data words and of the successive instructions.

It is, accordingly, an object of the present invention to provide an improved electronic digital computer system which incorporates a selection system for selecting information from the memory of the computer in an improved and simplified manner, and by which the access time for the selection of such information is reduced to a minimum.

Another object is to provide such an improved computer system which includes a selection system by which successive information may be selected from the memory of the computer on the basis of the location of previously selected information, so that the selection of information may proceed without any need for the memory to return, in each instance, to an index position; so as to reduce the access time of the computer to a minimum.

Yet another object is to provide such an improved computer system which includes a selection system by which information may be selected from the computer memory in an improved and simplified manner, and without any need for address tracks on the memory or for extraneous compare circuitry in the selection system.

A still further object is to provide such an improved computer system in which the system for selecting data from the memory of the computer may be controlled to make the selection on a relative basis in the manner described above, or on an absolute basis with respect to a particular reference position of the memory, as designated in each instance by the particular instruction being executed at any particular time.

The above and other objects and advantages of the invention may be more clearly understood upon reference to the following description, when taken in conjunction with the accompanying drawings, in which:

FIGURE 1 is a block diagram of a portion of an electronic digital computer incorporating the improved selection system of the present invention;

FIGURES 2A, 2B and 2C are representations of typical multi-bit instruction words which may be utilized in the computer of FIGURE 1; and FIGURE 3 is a table designating a binary counting function performed by a register in the computer, as will be described.

The various components of the system shown in FIGURE 1 are illustrated in block form. The circuitry of the individual components forms no part of the present invention, and any appropriate known circuit configuration may be used.

For example, "and" gates and "or" gates are well known to the digital computer art, and a detailed circuit explanation of such gates is deemed unnecessary. As is well known, the "and" gate provides an output term, which is true when all its input terms are true.

Conversely, an "or" gate provides an output term, which is true when any of its input terms are true.

Likewise, flip-flop circuits are well known to the digital computer art. These circuits are bi-stable networks, and they respond to signals applied to their respective input terminals to assume a stable "set" state or a stable "reset" state.

The system of FIGURE 1 is illustrated as including a magnetic memory 10 in the form of a magnetic drum. It is to be understood that the memory may be in the form of a magnetic disc, or it may assume any other suitable known configuration or design.

The information to be used by the computer is stored on the memory 10 in a plurality of adjacent channels or tracks, and in a plurality of sectors in each of the tracks. Each sector, for example, accommodates a computer word which, in turn in the particular example under consideration, is composed of thirty binary bits and a spacer bit. One such channel on the magnetic memory 10 is shown in FIGURE 1, and is designated, "Main Memory Channel."

The computer words mentioned in the preceding paragraph include, for example, different types of instruction words, such as shown in FIGURES 2A and 2B, and data words or operand words such as shown in FIGURE 2C. As illustrated in FIGURE 2C, the data word takes the form of a 30-bit binary number in which the zero bit serves as the sign bit.

As is well known, the instructions and data words are selected from the memory by a track selection network and by a sector selecting means. The track selection network responds to the track address illustrated at $t_6$–$t_{10}$ bit time of the instructions of FIGURES 2A and 2B, so as to select the track for the desired data word to be operated upon by the instruction. Such a track selection network is well known, and is not shown in the system of FIGURE 1.

In addition to the track selection, appropriate sector selection means must be included in the computer system to choose the proper sector for the desired operand or data words. The sector address is included in the instruction of FIGURE 2Z at the $t_{11}$–$t_{17}$ bit position. Likewise, the instructions of FIGURES 2A and 2B include the track address for the next instruction ($t_{18}$–$t_{22}$), and also the sector address for the next instruction ($t_{23}$–$t_{29}$).

As mentioned above, it has been the usual practice in the prior art computers to provide a register for the sector address of a desired operand or instruction from memory, and the address in the register is compared with each of a series of addresses read from an address track on the memory member of the prior art computer until coincidence is achieved. The present invention, as mentioned above, is particularly concerned with an improved sector selection system which is simple as compared with the prior art sector selection systems, and which provides for a minimum of access time.

The thirty bit instruction word of FIGURE 2A is a usual memory instruction word, and it selects an operand, or data word, from memory in the manner described above. The instruction indicates the operation to be performed on the operand by an "order" contained in the ($t_1$–$t_5$) bit positions of the instruction.

The non-memory instruction word of FIGURE 2B, for example, deals with orders which do not require operands from memory. The operand address portion of the instruction of FIGURE 2A is replaced in the instruction of FIGURE 2B, by a first number ($t_{11}$–$t_{17}$) which indicates the duration of the instruction, and by a second number ($t_6$–$t_{10}$) which indicates a register which is to be used as the operand.

Each of the instructions of FIGURES 2A and 2B includes an absolute bit at the $t_0$ bit position. The purpose and function of this bit will be described herein. A spacer bit ($t_{30}$) separates the successive instruction and operand words.

The magnetic memory 10 also includes additional channels for timing purposes, and which also serves as storage means for the various dynamic circulating registers of the computer.

The two timing channels of the magnetic memory 10 are designated the "index channel" and the "clock channel," respectively. The index channel provides an indication for each revolution of the memory. This indication is sensed once for each revolution of the memory by a read head designated by the arrow 12, and the resulting pulses are applied to the input terminal of an amplifier 14 in the system of FIGURE 1. It will be appreciated that the index pulses sensed by the read head 12 are also used for other purposes (not shown) in the computer.

The clock channel of the memory 10 includes clock recordings corresponding to each bit time in the computer, and these recordings are sensed by a read head designated by the arrow 16. The resulting clock pulses produced by the read head 16 are applied to a clock pulse amplifier 18 which supplies clock pulses for the computer.

The clock pulse amplifier 18 is further connected to a bit timing counter 20. The bit timing counter 20 is constructed in known manner, and it has a plurality of output terminals $t_0, t_1, t_2 \ldots t_{30}$. The various bit timing signals utilized by the computer appear at the different output terminals of the bit timing counter 20.

In a constructed embodiment of the invention, the various channels on the drum 10 were divided into 128 sectors, with each sector capable of storing a 31-bit word. These words have been described above, and are shown in FIGURES 2A–2C. The bit timing counter 20 therefore develops 31 different bit timing signals for timing the different bits of each word in the sectors on the memory 10.

The selected main memory channel is read by a read head designated 24, and the output from the read head is amplified by a read amplifier 27. The read amplifier produces outputs M, $\overline{M}$.

The memory 10 also includes a "C" register channel which is used particularly in the sector selection system illustrated in FIGURE 1. The instruction word selected from the main memory is instruced into the "C" register channel, in a manner to be described, and by way of a write head indicated by the arrow 26. The information read into the "C" register channel is read from the channel thirty-one bit times later by means of a read head, designated by the arrow 28.

The read head 28 is coupled to a read amplifier 30. The read amplifier includes a usual flip-flop, or appropriate inverter circuit, so that it can develop the contents of the "C" register channel in amplified form ($\overline{R}_c$) at a first of its output terminal, and so that it can develop the complement ($R_c$) at a second output terminal.

The ($\overline{R}_c$) output terminal of the read amplifier 30 is connected to an "and" gate 32, and the ($R_c$) output terminal is connected to an "and" gate 34. The "and" gates 32 and 34 are connected to an "or" gate 36.

The system of FIGURE 1 includes a read-in flip-flop 40. Appropriate recirculate control logic is connected to the reset input terminal of the read-in flip-flop 40, and appropriate read-in control logic is connected to the set input terminal of the flip-flop.

The set output terminal of the read-in flip-flop 40 is connected to an "and" gate 42 and to an "and" gate 43; and the reset output terminal of the flip-flop is connected to the "and" gates 32 and 34. The "and" gates 42 and 43 are also connected to the "or" gate 36. The $\overline{M}$ output of the read amplifier is connected to the "and" gate 42. The M output terminal of the read amplifier 27 is connected to the "and" gate 43, and to an "and" gate 52.

The "or" gate 36 is coupled to a write amplifier 46.

The write amplifier is coupled to the write head 26 associated with the "C" register as explained above.

The output terminal of the index bit read amplifier 14 is connected to the set input terminal of an "absolute" flip-flop 54. The "and" gate 52 is connected to the reset input terminal of the flip-flop 54. The set output terminal of the read-in flip-flop is also connected to the "and" gate 52. The bit timing signal $t_0$ is also applied to the "and" gate 52.

The set output terminal of the flip-flop 54 is connected to an "and" gate 56, and an "or" gate 58 is also connected to the "and" gate 56. The "and" gate 56 is connected to the reset input terminal of a control flip-flop 60. The bit timing signals $t_{11}$ and $t_{23}$ are applied to an "or" gate 58. The bit timing signals $t_{18}$ and $t_{30}$ are applied to an "or" gate 59. The "or" gate 59 is connected to the set input terminal of a control flip-flop 60. The "or" gate 36 is connected through an inverter 61 to a delay line 64. The delay line 64 is connected to the "or" gate 59.

The "and" gates 32 and 42 are connected to an "or" gate 61. The "or" gate 61 is connected to an "and" gate 62. The set output terminal of the control flip-flop 60 is connected to the "and" gates 43 and 34. The reset output terminal of the flip-flop 60 is connected to an "and" gate 63 and to the "and" gates 32 and 42. Bit timing signals $t_{17}$ and $t_{30}$ are applied to the "and" gates 62 and 63 respectively. The output terminal of the "and" gate 62 is connected to an output terminal 70 of the system, and the "and" gate 63 is connected to an output terminal 71.

In the operation of the system of FIGURE 1, appropriate read-in logic initially sets the read-in flip-flop 40, and the control flip-flop 60 is set at $t_{30}$ bit time at the end of the previous word time so as to enable the "and" gate 43. This permits an instruction word, such as shown in FIGURE 2A or in FIGURE 2B, to be read through the "or" gate 36 and through the write amplifier 46 into the "C" register channel on the memory drum 14.

During the read-in phase, the "and" gate 43 is initially enabled, as mentioned above, so that the selected instruction M from the main memory channel is read in unchanged form into the "C" register. However, at $t_{11}$ time, the control flip-flop 60 is reset, so as to enable the "and" gate 42. Therefore, for the operand sector address portion ($t_{11}$–$t_{17}$) (FIGURE 2A) of the selected instruction, the complement $\overline{M}$ is read into the "C" register. However, the first "1" to be encountered in the selected instruction in the ($t_{11}$–$t_{17}$) portion causes the inverter 61 and delay line 64 to set the control flip-flop 60 immediately after the write amplifier 46 has accepted the $\overline{M}$ data bit. This setting of the control flip-flop again enables the "and" gate 43 so that the selected instruction is again read into the "C" register in unchanged form.

A similar control on the selected instruction is exerted during the ($t_{23}$–$t_{29}$) bit times of the "next instruction" sector address. Therefore, and as shown by the table of FIGURE 3, the selected instruction is serially read into the "C" register in its original form by the logic of FIGURE 1, except for the sector address portions ($t_{11}$–$t_{17}$) and ($t_{23}$–$t_{29}$). These latter portions are counted down one bit in the manner shown by the table in FIGURE 3. In that table it is assumed that the sector address in each instance is 1111111. However, it is evident that each sector address in the selected instruction will usually be different from 1111111 and from one another.

At the end of the read-in phase, and at $t_{30}$ bit time, appropriate recirculate logic resets the flip-flop 40 to disable the "and" gates 42 and 43 and to enable the "and" gates 32 and 34.

The selected instruction word read into the "C" register channel is now read by the read head 28 and amplified by the read amplifier 30. The instruction word appears serially at successive bit times at the ($R_c$) and ($\overline{R}_c$) output terminals of the read amplifier 30. As mentioned above, the instruction word appears in its original form at the output terminal $R_c$ of the read amplifier, and it appears in complemented form at the output terminal $\overline{R}_c$.

The control flip-flop 60 is initially set by the $t_{30}$ bit timing pulse at the end of the previous word time, the bit timing pulse being applied to the reset input terminal of the control flip-flop 60 through the "or" gate 59. During the interval that the control flip-flop 60 is set, the "and" gates 34 and 43 are enabled and the "and" gates 32 and 42 are disabled. This means that the output $R_c$ from the read amplifier 30 passes through the "and" gate 34 and through the "or" gate 36. The resulting output from the "or" gate 36 passes through the write amplifier 46 back to the "C" register channel. Therefore, so long as the control flip-flop 60 is in its set condition, the contents of the "C" register recirculates in unchanged form through the system.

However, at $t_{11}$ bit time, at the beginning of the operand sector address of the instruction word of FIGURE 2A, or at the beginning of the instruction duration count of the instruction word of FIGURE 2B, the control flip-flop 60 is reset. This occurs, however, only if the absolute bit ($t_0$) of the corresponding instruction is a zero. This is because the absolute flip-flop 54 is set at the occurrence of the index bit at the output of the read amplifier 14 at the start of each revolution of the drum 10. This enables the "and" gate 56, and if the absolute $t_0$ bit is a zero, the flip-flop 54 remains set at the $t_{11}$ bit time. If the flip-flop 54 is in its set condition at $t_{11}$ bit time, the $t_{11}$ bit timing pulse is able to pass through the "and" gate 56 and through the "or" gate 58 to set the control flip-flop 60.

Therefore, in the event that the absolute $t_0$ bit of the instruction of FIGURE 2A, or of the instruction of FIGURE 2B, is a zero, the system of the invention continues its count at the $t_{11}$ bit time immediately following the introduction of the instruction into the "C" register. When that occurs, the control flip-flop 60 is reset so as to enable the "and" gate 32 and disable the "and" gate 34. This means that the complement output from the output terminal ($\overline{R}_c$) of the read amplifier 30 is circulated through the system, instead of the original form output from the ($R_c$) output terminal of the read amplifier.

The complemented output from the read amplifier 30 continues to circulate through the system of FIGURE 1 until a binary "1" is encountered. When that occurs, the delay line 64 passes a pulse through the "or" gate 59 at the following bit time to set the control flip-flop 60 immediately after the $\overline{R}_c$ bit has been accepted by the write amplifier 46, so that the un-complemented output from the ($R_c$) output terminal of the read amplifier 30 then circulates through the system.

The binary counter portion of the above described system is similar to that disclosed and claimed in copending application Serial No. 253,206, filed January 22, 1963. An examination of the table of FIGURE 3 will reveal that the complementing of the circulating contents for any circulation until a "1" is encountered causes the circulated contents to undergo a binary count down for each successive circulation.

At the $t_{18}$ bit time of any circulation, the control flip-flop 60 is again set, so that the contents of the "C" register circulates through the system in normal manner until the $t_{23}$ bit time. At this time, the same binary count down operation is made on the next instruction sector address (FIGURES 2A, 2B) between the $t_{23}$ and $t_{29}$ bit times of the instruction.

Therefore, so long as the $t_0$ absolute bit of an instruction word is zero, any instruction circulated through the system of FIGURE 1 immediately undergoes a count down insofar as its ($t_{11}$–$t_{17}$) and ($t_{23}$–$t_{29}$) bit portions are concerned. This count down for each portion continues until the binary 000 . . . state is reached. At that time, the control flip-flop 60 remains in its reset state, up to either at $t_{18}$ bit time to indicate that the operand sector address has been counted to zero, or up to the $t_{30}$ bit time to indicate that the next instruction address has been counted to zero.

When the next instruction sector address has been counted to zero, the "and" gate 63 is enabled by the control flip-flop 60 at the $t_{30}$ bit time, so that the $t_{30}$ bit timing pulse may be passed to the output terminal 71.

When the operand sector address has been counted to zero either $\overline{R}_c$ or $\overline{M}$ is a 1 at $t_{17}$ bit time, and the "and" gate 42 or 43 is enabled, so that the "or" gate 61 passes a 1 to the "and" gate 62 at $t_{17}$ bit time. This permits the "and" gate 62 to pass the bit timing pulse $t_{17}$ to the output terminal 70.

The resulting output pulse at the output terminal 70 permits a transfer of information to be made with respect to the operand to be executed by the instruction word of FIGURE 2A, or an instruction duration count to be executed in accordance with the instruction word of FIGURE 2B, so as to allow the selection of the next instruction to be made in accordance with the sector designated by the sector address in the original instruction.

It will be appreciated that so long as the absolute bit $t_0$ of the instruction in the "C" register is zero, the count downs of the operand and instruction sector address portions of the instruction begin immediately; so that the sector of the operand and of the next instruction is determined in relation to the sector of the instruction actually being executed. This relative address feature provides for an extremely fast access time to the memory 10, because there is no need to wait until the memory returns to an index position before the count to the sector address of the operand or next instruction can begin. Indeed, with proper programming there can be zero dead time in the selection due to the fact that the first count occurs actually during the read-in phase, as described above.

However, if so desired, the system can be made to operate on an absolute basis, and with reference to a particular index on the memory 10. This is achieved for any instruction in which the absolute $t_0$ bit is a "1," for example. When that occurs, the absolute flip-flop 54 is reset because the "and" gate 52 is enabled at $t_0$ bit time to pass the corresponding "1" to the reset input terminal of the flip-flop 54. When the flip-flop 54 is reset, the "and" gate 56 is disabled.

Since the absolute flip-flop 54 is now in its reset condition, no count can begin with respect to the sector addresses by the system of FIGURE 1 until the reference position of the magnetic memory 10 has been reached. Once the index position of the drum has been reached, the absolute flip-flop 54 is again set, then the system of FIGURE 1 operates in the manner described above to count down the sector address portions of the instruction word in the "C" register to zero.

It will be appreciated, therefore, that when the absolute bit $t_0$ of the instruction word being executed as a "1," for example, the only difference in the operation of the system of FIGURE 1 is that the system waits until the index position of the magnetic memory 10 is reached before it begins its binary count down.

Therefore, during this latter mode of operation, the sector addresses of desired data and instruction words are referenced to the reference position of the drum; whereas, during the first mode of operation, the sector addresses of the desired data and instruction words are related to the actual sector address of the instruction being executed at any particular time.

The completion of the binary count down of both sector addresses of the instruction in the "C" register during the latter mode of operation, is also evidenced by an output at one of the output terminals 70 and 71, followed by an output at the other.

The invention provides, therefore, an improved selection system for use in an electronic digital computer. It will be appreciated that the improved selection system of the invention is advantageous in that it is capable of selecting desired sectors of a movable memory member without any need for a separate address track on the memory member or for extraneous compare networks.

In addition, the improved selection system of the invention is capable of a sector selection based on a relative sector address concept, by which the sector of an operand or succeeding instruction is referenced to the actual sector address of the instruction being executed. This, as mentioned above, obviates any need to reference all sectors to a particular reference on the drum, and reduces access time in the computer by a material extent.

While a particular embodiment of the invention has been shown and described, modifications may be made, and it is intended in the claims to cover such modifications which fall within the spirit and scope of the invention.

What is claimed is:

1. In a digital computer system which includes a rotatable member in which a plurality of multi-bit words of binary-coded data may be stored in a plurality of sectors in each of a plurality of tracks extending around the memory member, and in which an index bit is stored in one track on said memory member at a selected position thereon to indicate when said memory member has a predetermined angular position, the combination of: a dynamic register for storing a multi-bit binary signal corresponding to one of said words, said signal being derived from a particular sector in a particular track of said memory and including a portion representing a multi-bit number designating a selected sector in any one of said tracks and further including a binary control bit; sensing means coupled to said register for serially deriving said multi-bit binary signal therefrom; writing means coupled to said register for serially introducing said multi-bit binary signal thereto; circulating circuitry inter-coupling said sensing means and said writing means for circulating said binary signal through said register and including binary counter means for causing said portion of said multi-bit binary signal in said register to undergo a binary count in each successive circulation thereof to said circulating register; control circuitry coupled to said circulating circuitry for activating said binary counter means; further circuitry coupled to said memory member and to said control circuitry for deriving said index bit and for selecting the control bit from the signal introduced to said register, said further circuitry enabling said control circuitry at a time independent of said index bit when said control bit has a first binary value and for enabling said control circuitry at a time determined by said predetermined angular position of said memory member when said control bit has a second binary value; and output circuitry coupled to said binary counter means for providing a selection control signal when said portion of said multi-bit binary signal in said register has been counted to a reference number by said binary counter means, said selection control signal serving to control the transfer of information with respect to said selected sector of said memory member.

2. The system defined in claim 1 in which said memory member is in the form of a movable magnetic member, and in which said sensing means and said writing means are electro-mechanical transducers.

References Cited by the Examiner
UNITED STATES PATENTS 2,815,168  12/1957  Zukin _____ 340—172.5
2,863,134  12/1958  Buchholz _____ 240—172.5

ROBERT C. BAILEY *Primary Examiner.*

M. LISS, *Assistant Examiner.*